US00RE49489E

(19) United States
(12) Reissued Patent
Ito et al.

(10) Patent Number: US RE49,489 E
(45) Date of Reissued Patent: Apr. 11, 2023

(54) TOUCH PANEL DEVICE AND TOUCH PANEL CONTROL PROGRAM FOR IGNORING INVALID TOUCH

(71) Applicant: SEIKO EPSON CORPORATION, Tokyo (JP)

(72) Inventors: Akemi Ito, Nagano (JP); Masatoshi Matsuhira, Nagano (JP)

(73) Assignee: Seiko Epson Corporation, Tokyo (JP)

(21) Appl. No.: 17/333,237

(22) Filed: May 28, 2021

Related U.S. Patent Documents

Reissue of:
(64) Patent No.: 10,437,387
Issued: Oct. 8, 2019
Appl. No.: 15/729,921
Filed: Oct. 11, 2017

(30) Foreign Application Priority Data

Oct. 26, 2016 (JP) ..... 2016-209700

(51) Int. Cl.
*G06F 3/041* (2006.01)

(52) U.S. Cl.
CPC ..... *G06F 3/04186* (2019.05); *G06F 2203/04104* (2013.01)

(58) Field of Classification Search
CPC ..... G06F 3/04186; G06F 2203/04104
See application file for complete search history.

(56) References Cited

U.S. PATENT DOCUMENTS

2006/0017709 A1* 1/2006 Okano ..... G06F 3/0418 345/173
2009/0160780 A1* 6/2009 Arnold ..... G06F 3/0418 345/173
2009/0160808 A1* 6/2009 Wu ..... G06F 3/03547 345/173
2013/0055080 A1* 2/2013 Komer ..... G06F 3/0421 345/173
2013/0201160 A1* 8/2013 Ito ..... G06F 3/0418 345/178
2014/0132562 A1 5/2014 Miyamoto et al.
2014/0160070 A1 6/2014 Miyamoto et al.
2014/0375608 A1 12/2014 Yumoto et al.
2015/0277539 A1* 10/2015 Chueh ..... G06F 1/3262 345/178
2016/0041690 A1* 2/2016 Kuehne ..... B60K 37/06 345/173

(Continued)

FOREIGN PATENT DOCUMENTS

JP 06-095802 A 4/1994
JP H06-095802 A 4/1994

(Continued)

*Primary Examiner* — Adam L Basehoar

(74) *Attorney, Agent, or Firm* — Global IP Counselors, LLP

(57) ABSTRACT

A touch panel device includes a touch detection unit, a touch determination unit, and an instruction acceptance unit. The touch detection unit is configured to detect simultaneous touches on a plurality of points on a display. The touch determination unit is configured to determine whether the simultaneous touches that have been detected include a valid touch or an invalid touch. The instruction acceptance unit is configured to ignore the invalid touch and accept an instruction based on the valid touch.

11 Claims, 7 Drawing Sheets

(56) References Cited

U.S. PATENT DOCUMENTS

| | | | | |
|---|---|---|---|---|
| 2016/0092009 | A1* | 3/2016 | Wu | G06F 3/0418 345/173 |
| 2016/0092025 | A1* | 3/2016 | Wu | G06F 3/04883 345/173 |
| 2016/0253041 | A1* | 9/2016 | Park | G06F 3/0446 345/174 |
| 2016/0328112 | A1* | 11/2016 | Jiang | G06F 3/0488 |
| 2017/0108992 | A1* | 4/2017 | Lee | G06F 3/0447 |
| 2017/0123590 | A1* | 5/2017 | Han | G06F 3/04166 |
| 2017/0371479 | A1* | 12/2017 | Li | G06F 3/016 |

FOREIGN PATENT DOCUMENTS

| | | | | |
|---|---|---|---|---|
| JP | 2006-039686 | A | 2/2006 | |
| JP | 2013-142922 | A | 7/2013 | |
| JP | 2013-161221 | A | 8/2013 | |
| WO | 2016/086363 | A1 | 6/2016 | |
| WO | WO 2016/086363 | * | 9/2016 | G06F 3/041 |

* cited by examiner

TOUCH PANEL DEVICE AND TOUCH PANEL CONTROL PROGRAM FOR IGNORING INVALID TOUCH

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application *is a Reissue application of U.S. patent application Ser. No. 15/729,921 filed on Oct. 11, 2017, now U.S. Pat. No. 10,437,387 issued on Oct. 8, 2019, which* claims priority to Japanese Patent Application No. 2016-209700 filed on Oct. 26, 2016. The entire [disclosure] *disclosures* of *U.S. patent application Ser. No. 15/729,921 and* Japanese Patent Application No. 2016-209700 [is] *are* hereby incorporated herein by reference.

BACKGROUND

Technical Field

The present invention relates to a touch panel device and a touch panel control program.

Related Art

A known touch panel is operable by touches on a plurality of locations.

For example, disclosed is an optical touch panel in which when a finger of a user contacts a portion on a panel, the finger blocks beams and the blocked portion is detected so that the location contacted by the finger is recognized (see JP-A-06-95802).

SUMMARY

In some cases, an unnecessary object not intended by a user in operating a touch panel (hereinafter referred to as foreign matter) is present on a screen of a touch panel. The foreign matter can be various objects left on the screen of the touch panel by a user, such as a business card, other paper sheets, or stationery. The foreign matter can also be, for example, waste accidentally left on the screen of the touch panel or a user's hand unconsciously placed on the screen (i.e., a hand of a user opposite to a hand actively moved by a user for operation).

If foreign matter is present on the screen of the touch panel, an operation intended by a user might fail to be accepted. For example, even with the intention of the user to operate the touch panel with a finger, since the presence of foreign matter is detected by the touch panel, an erroneous determination as a multi-touch including the foreign matter might be made. In a case where an input screen to be operated with a single-touch is displayed on the touch panel, if foreign matter is present, the single-touch that has been already recognized on the touch panel might prevent the touch panel from reacting as intended by the user even with a user's operation in this situation. These problems can occur in other cases as well as the optical touch panel.

An advantage of some aspects of the invention is to provide a touch panel device and a touch panel control program that can achieve more comfortable operability for users.

According to an aspect of the present invention, a touch panel device includes a touch detection unit, a touch determination unit, and an instruction acceptance unit. The touch detection unit is configured to detect simultaneous touches on a plurality of points on a display. The touch determination unit is configured to determine whether the simultaneous touches that have been detected include a valid touch or an invalid touch. The instruction acceptance unit is configured to ignore the invalid touch included in the simultaneous touches and accept an instruction based on the valid touch in the simultaneous touches.

With this configuration, the touch panel device determines whether a detected touch is a valid touch or an invalid touch, an invalid touch included in the simultaneous touches is ignored, and an instruction based on a valid touch included in the simultaneous touches is accepted. Thus, even if foreign matter as described above is present on the display, the presence of the foreign matter is ignored as an invalid touch, and an instruction based on a valid touch, that is, an instruction in accordance with an operation by a user, is accepted so that the user can operate the touch panel device with comfort.

The simultaneous touches herein refer to a situation where a plurality of touches are present on the display at a certain point of time, and do not refer to a situation where a plurality of touches on the display start at the same time and finish at the same time. (Note that the situation where a plurality of touches on the display start at the same time and finish at the same time is a type of the simultaneous touches).

According to an aspect of the invention, the touch determination unit may determine, as the invalid touch, a touch that is stationary for a first time or longer.

With this configuration, a touch that is stationary for a time greater than or equal to a certain time is determined as an invalid touch so that foreign matter, which is stationary on the display in most cases, can be determined as an invalid touch.

According to an aspect of the invention, the touch determination unit is configured to determine, as the invalid touch, a touch for which an amount of change of touch center coordinates is less than a first predetermined threshold for a first time or longer and for which an amount of change of a touch area is less than a second predetermined threshold for the first time or longer.

With this configuration, a touch whose position and area hardly change is determined as an invalid touch so that foreign matter can be determined as an invalid touch with high probability.

According to an aspect of the invention, the touch determination unit may determine, as the invalid touch, a touch detected first in two touches detected with an interval of a second time or longer.

Two touches detected with a certain time interval or longer seldom have a correlation, and one of the two touches that is detected first is supposed to be a touch by foreign matter. Thus, with this configuration, foreign matter can be determined as an invalid touch with high probability.

According to an aspect of the invention, when a touch detected later in the two touches continues for a third time or longer, the touch determination unit may determine, as the invalid touch, the touch detected first.

With this configuration, in a case where one of the two touches detected later disappears suddenly, the touch detected first is not determined as an invalid touch so that an intention of a user can be appropriately satisfied.

According to an aspect of the invention, the touch determination unit may determine, as the invalid touch, a touch having an area greater than or equal to a third predetermined threshold.

With this configuration, an object obviously larger than an indication tool such as a user's finger or a pen is determined as an invalid touch so that foreign matter can be determined as an invalid touch with high probability.

According to an aspect of the invention, the touch determination unit may further determine, as the invalid touch, a touch having an area less than or equal to a fourth predetermined threshold smaller than the third predetermined threshold.

With this configuration, an object obviously smaller than an indication tool such as a user's finger or a pen (e.g., small waste exemplified by dust and dirt) is determined as an invalid touch so that foreign matter can be determined as an invalid touch with high probability.

According to an aspect of the present invention, the touch panel device may further include a display control unit that causes a warning about a touch determined as the invalid touch at a position on the display, and the position is a position where no touches are detected.

With this configuration, a warning about an invalid touch can be displayed at a position on the display easily visually recognized by the user.

A technical idea of the invention is also implemented as categories except a touch panel device. For example, an aspect of the invention can be implemented as each of a method including processes performed by the touch panel device and a program (touch panel control program) that causes a computer to execute these processes. A computer-readable storage medium storing the program is, of course, established as the invention.

BRIEF DESCRIPTION OF THE DRAWINGS

Referring now to the attached drawings which form a part of this original disclosure.

DETAILED DESCRIPTION OF EXEMPLARY EMBODIMENTS

Embodiments of the present invention will be described with reference to the drawings. The drawings are merely example illustrations of the embodiments.

1. General Description of Device Configuration

Figure 1:
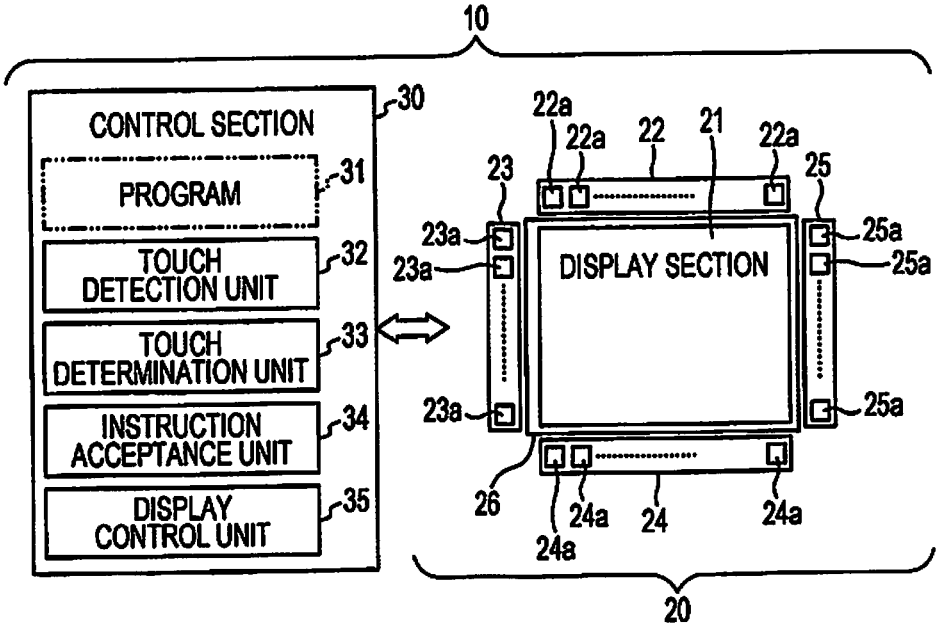
FIG. 1 is a block diagram schematically illustrating a configuration of a touch panel device.

FIG. 1 schematically illustrates a configuration of a touch panel device 10 according to this embodiment using a block diagram. The touch panel device 10 is mounted on various devices that require a touch panel as a unit for input or display, such as a consumer transaction facility, a multifunctional device functioning as a printer and other devices, and other terminal devices. The touch panel device 10 may be referred to as a display device.

Alternatively, a device incorporating the touch panel device 10 as a part of the configuration thereof may be referred to as a display device.

The touch panel device 10 includes a touch panel 20 and a control section 30 that controls the touch panel 20. The control section 30 includes a driving circuit for driving the touch panel 20, and a control circuit for generally controlling a behavior of the touch panel 20 based on a program. The control circuit substantially includes a processor (that includes a CPU, an ASIC, and the like, and a combination thereof and may be constituted by a single chip or a plurality of chips operating in corporation with each other) and a memory, for example. The control section 30 executes a process in accordance with an installed program (touch panel control program) 31 to, thereby, obtain functions as a touch detection unit 32, a touch determination unit 33, an instruction acceptance unit 34, and a display control unit 35, for example.

In the example of FIG. 1, the touch panel 20 is illustrated as an optical touch panel. The touch panel 20 includes a display section (display) 21, light source units 22 and 23, and light receiving units 24 and 25. The display section 21 is, for example, a liquid crystal display, and displays a screen for receiving various types of information for a user or a user's operation under control of the control section 30. The light source unit 22 includes a plurality of light sources 22a arranged along a side of a substantially rectangular display section 21 outside the display section 21. The light receiving unit 24 includes a plurality of optical sensors 24a arranged along a side of the display section 21 opposite to the side thereof along which the light sources 22a are arranged, and is disposed outside the display section 21. On the other hand, the light source unit 23 includes a plurality of light sources 23a arranged along a side of the display section 21 adjacent to the side thereof along which the light source unit 22 is provided, and is disposed outside the display section 21. The light receiving unit 25 includes a plurality of optical sensors 25a arranged along a side of the display section 21 opposite to the side thereof along which the light source unit 23 is provided, and is disposed outside the display section 21.

The light sources 22a and 23a are, for example, LEDs, and the optical sensors 24a and 25a are, for example, photodiodes. A bezel 26 of a material such as a transparent resin may be disposed at the four edges o f the display section 21. The bezel 26 also serves as a lens. Light emitted from a light source travels over the display section 21 through the bezel 26 to enter an opposite optical sensor.

The control section 30 causes each of the light sources 22a and 23a to emit light. Light emitted from one light source 22a travels over the display section 21 to enter the opposite optical sensor 24a. Similarly, light emitted from one light source 23a passes over the display section 21 to enter the opposite optical sensor 25a. Each of the optical sensors 24a and 25a outputs, to the control section 30, a current value (detection value) in accordance with the amount of received light. When an indication tool (hereinafter referred to as a finger or the like), such as a finger or a pen, contacts an arbitrary position on the display section 21, that is, when a touch on the touch panel 20 is made, the finger or the like blocks light entering from some of the light sources 22a, 23a to some of the optical sensors 24a, 25a. Consequently, a detection value by the some of the optical sensors 24a and 25a decreases. Accordingly, when a detection value by one optical sensor is below a predetermined reference value, for example, the touch detection unit 32 determines that there is a touch on the display section 21 at a position corresponding to this optical sensor.

The touch detection unit 32 reads a level of the detection value by each of the optical sensors 24a and 25a to detect the presence of a touch on the display section 21. If the touch detection unit 32 detects the presence of a touch, the touch detection unit 32 computes a position (coordinates on the display section 21) on which the touch is made. For example, an array of the light sources 22a constituting the light source unit 22 will be hereinafter referred to as a light source-side X array, and an array of the optical sensors 24a constituting the light receiving unit 24 will be hereinafter referred to as a light receiving-side X array. Similarly, an array of the light sources 23a constituting the light source unit 23 will be hereinafter referred to as a light source-side Y array, and an array of the optical sensors 25a constituting the light receiving unit 25 will be hereinafter referred to as a light receiving-side Y array. The touch detection unit 32 defines locations of the light sources 22a in the light source-side X array and locations of the optical sensors 24a in the light receiving-side X array by using a common coordinate system (X coordinate system).

Similarly, the touch detection unit 32 defines locations of the light sources 23a in the light source-side Y array and locations of the optical sensors 25a in the light receiving-side Y array by using a common coordinate system (Y coordinate system).

The touch detection unit 32 specifies an X coordinate of the optical sensor 24a whose detection value is smaller than the reference value and a Y coordinate of the optical sensor 25a whose detection value is smaller than the reference value. In this manner, the touch detection unit 32 can specify a location on the display section 21 on which a touch is made, by using coordinates (X, Y). The touch detection unit 32 can detect simultaneous touches that were made at the same time on a plurality of points on the display section 21. That is, in a situation where two or more points on the display section 21 are touched, the touch detection unit 32 can detect individual touches and specify coordinates of each of the touches.

Touches that can be detected by the touch detection unit 32 can include not only touches by a finger or the like intended by a user but also touches caused by foreign matter as described above. This embodiment proposes a configuration for appropriately responding to a touch intended by a user without the influence of such touches caused by foreign matter.

That is, the touch panel device 10 includes the touch detection unit 32 capable of detecting simultaneous touches on a plurality of points on the display section 21, the touch determination unit 33 that determines whether the detected touch is a valid touch or an invalid touch, and the instruction acceptance unit 34 that accepts an instruction based on the valid touch included in the simultaneous touches.

2. First Embodiment

Figure 2:
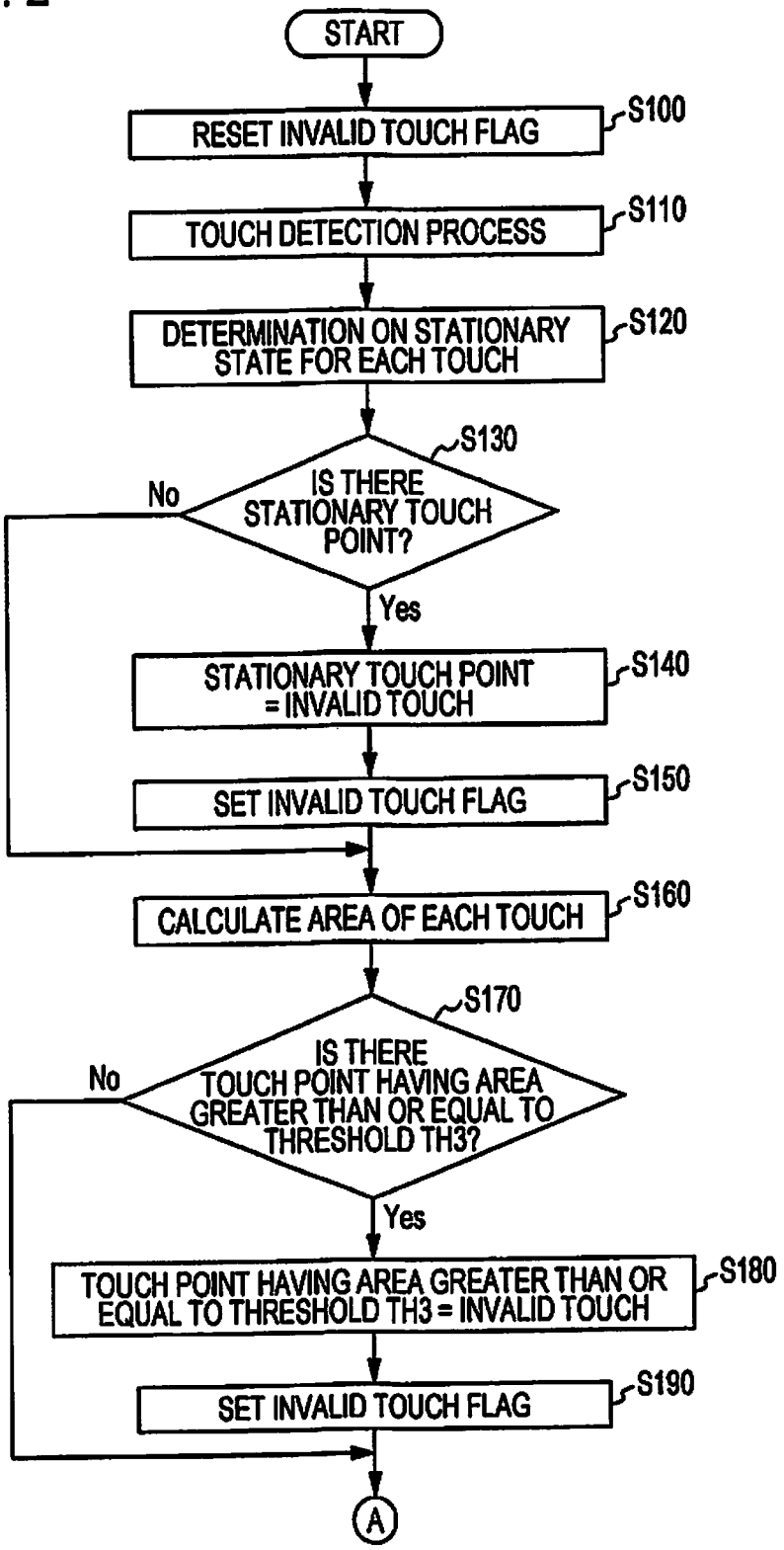
FIG. 2 is a flowchart depicting a part of an erroneous touch detection determining process according to a first embodiment.
Figure 3:
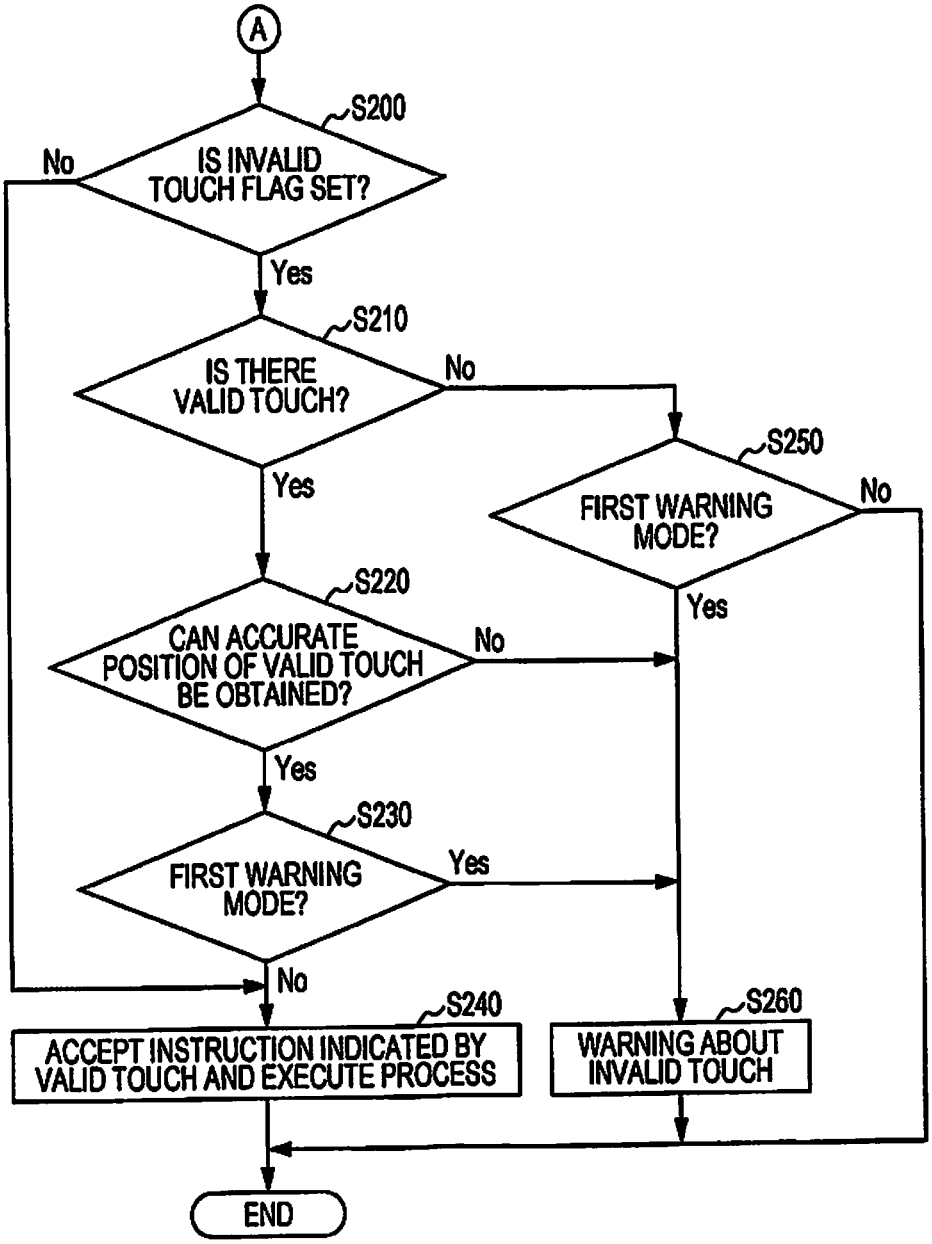
FIG. 3 is a flowchart depicting a part of the erroneous touch detection determining process according to the first embodiment.

FIGS. 2 and 3 depict, by using flowcharts, an erroneous touch detection determining process that is executed by the control section 30 in accordance with the program 31. The flowcharts are repeatedly performed after start-up of the touch panel device 10 by turning on a power supply of the touch panel device 10 (a device incorporating the touch panel device 10). An embodiment described with reference to FIGS. 2 through 7 will be hereinafter referred to as a first embodiment.

The touch determination unit 33 resets an invalid touch flag indicating the presence of an invalid touch (step S100). That is, the invalid touch flag is eliminated. After the invalid touch flag has been reset, the touch detection unit 32 performs a touch detection process (step S110). In the touch detection process, the touch detection unit 32 detects whether a touch on the display section 21 is present or not as described above, and if the touch detection unit 32 successfully detects a touch on at least a point on the display section 21, the process proceeds to step S120.

In step S120, at each touch (touch point) detected by the touch detection process, the touch determination unit 33 performs stationary determination for determining whether the touch point is stationary for a predetermined time T1 (first time, e.g., five minutes) or longer. In this embodiment, the "touch point" refers to a point or a region detected by the touch detection unit 32 as a result of contact (touch) of a user's finger or the like or foreign matter with the display section 21. In the following description, the touch or the touch point will also be used substantially as synonyms. When a user touches an arbitrary position on the display section 21 with a finger or the like, a certain area in accordance with the area of the finger or the like is touched. Thus, the touch detection unit 32 can detect, as one touch point, a series of regions constituted by continuous coordinate points where the presence of touches on the display section 21 is detected.

In step S130, the touch determination unit 33 receives a result of the stationary determination for each touch in step S120. If there are one or more touch points that are stationary for the time T1 or longer ("Yes" in step S130), the process proceeds to step S140. On the other hand, based on the result of the stationary determination for each touch in step S120, if there are not touch points that are stationary for the time T1 or longer ("No" in step S130), the process skips steps S140 and S150. If a touch is made by a user's finger or the like that is moved for an operation of the touch panel 20, the finger or the like is not expected to be stationary on the display section 21 for a long time, whereas if the touch is made by the foreign matter described above, the foreign matter is basically stationary on the display section 21. In view of this, a touch point that is stationary for the time T1 or longer is determined as an invalid touch.

Figure 4:
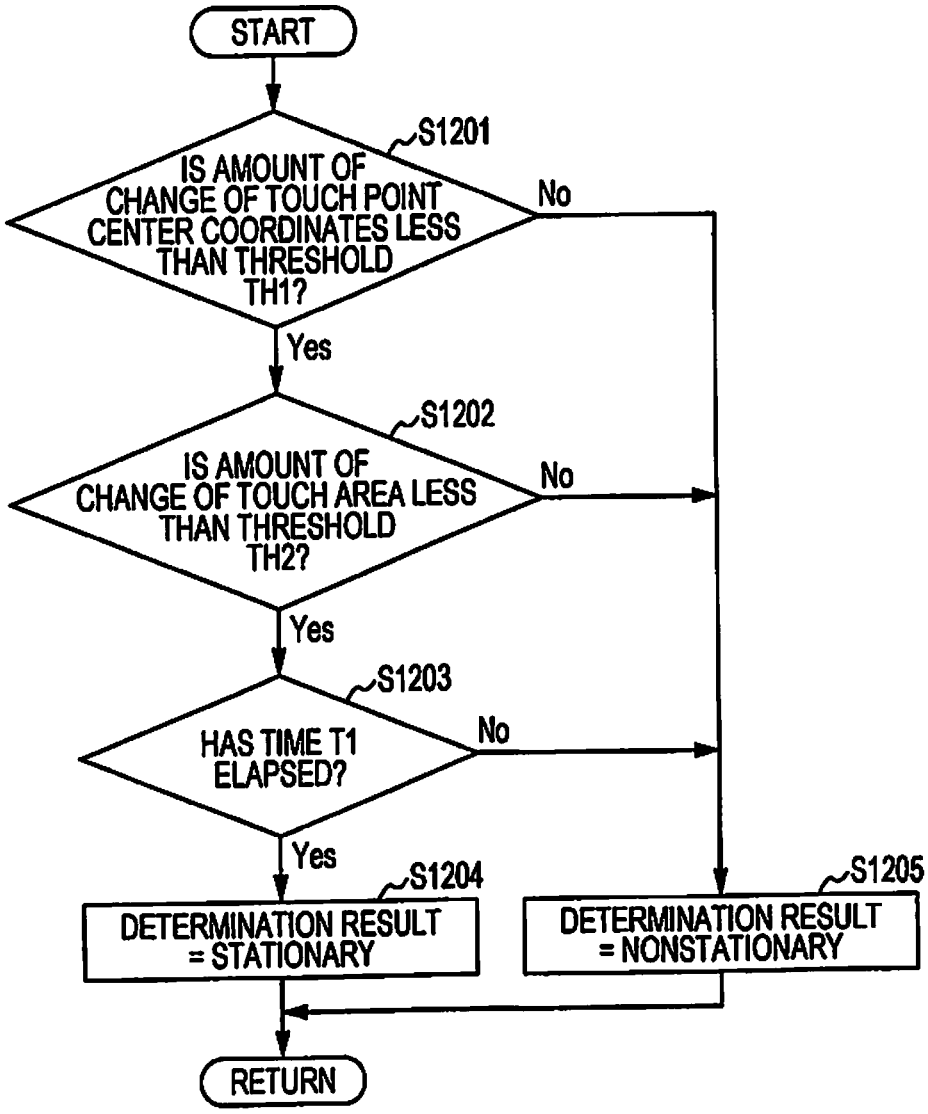
FIG. 4 is a flowchart depicting details of stationary determination.

FIG. 4 depicts, by using a flowchart, details of the stationary determination performed by the touch determination unit 33 for each touch point in step S120.

In step S1201, the touch determination unit 33 determines whether the amount of change of center coordinates (touch center coordinates) of a target touch point is less than a predetermined threshold TH1 (first predetermined threshold) for the amount of change of center coordinates. The center coordinates of the touch point refer to a coordinate point closer to the center of a region constituted by a group of coordinate points included in the touch point (the shape of the touch point).

The touch determination unit 33 specifies center coordinates of a target touch point at each small unit time, for example. If the distance between the previously specified center coordinates and the currently specified center coordinates with respect to the target touch point is less than the threshold TH1, the touch determination unit 33 determines that the amount of change of the center coordinates of the target touch point is less than the threshold TH1 ("Yes" in step S1201). On the other hand, if the distance between the previously specified center coordinates and the currently specified center coordinates is the threshold TH1 or more, the amount of change of the center coordinates of the target touch point is determined to be the threshold TH1 or more ("No" in step S1201). If the touch determination unit 33 determines "Yes" in step S1201, the process proceeds to step S1202, whereas if the touch determination unit 33 determines "No" in step S1201, the process proceeds to step S1205.

In step S1202, the touch determination unit 33 determines whether the amount of change of the area (touch area) of the target touch point is less than a predetermined threshold TH2 (second predetermined threshold) of the amount of change of the area. The touch determination unit 33 calculates the area of the target touch point at each small unit time, for example. If the difference between the previously calculated area and the currently calculated area for the target touch point is less than the threshold TH2, the touch determination unit 33 determines that the amount of change of the area of the target touch point is less than the threshold TH2 ("Yes" in step S1202). On the other hand, if the difference between the previously calculated area and the currently calculated area is the threshold TH2 or more, the amount of change of the area of the target touch point is determined to be the threshold TH2 or more ("No" in step S1202). If the touch determination unit 33 determines "Yes" in step S1202, the process proceeds to step S1203, whereas if the touch determination unit 33 determines "No" in step S1202, the process proceeds to step S1205.

In step S1203, the touch determination unit 33 determines whether a time during which "Yes" has been continuously selected for the target touch point in both steps S1201 and S1202 since "Yes" was selected in the touch detection process (step S110) has reached the time T1 or not. If the time has reached the time T1 ("Yes" in step S1203), the process proceeds to step S1204. On the other hand, if the times has not reached the time T1 yet ("No" in step S1203), the process proceeds to step S1205.

In step S1204, the touch determination unit 33 provides a determination result that the target touch point is stationary for the time T1 or longer, and terminates the stationary determination for the target touch point (flowchart in FIG. 4). On the other hand, in step S1205, the touch determination unit 33 provides a determination result that the target touch point is not stationary, and terminates the stationary determination for the target touch point (flowchart in FIG. 4). In this manner, if the amount of change of the center coordinates of a touch is less than the threshold TH1 of the amount of change of coordinates and a state in which the amount of change of the area of the touch is less than the threshold TH2 of the amount of change of the area continues for the time T1 or longer, the touch determination unit 33 determines the touch as a touch that is stationary for the time T1 or longer. In this manner, even in such a case where the touch panel 20 itself vibrates slightly, for example, foreign matter that is generally stationary can be identified.

As described above, the flowchart of the erroneous touch detection determining process (FIGS. 2 and 3) is repeatedly performed. Regarding a touch that is first detected in the touch detection process in step S110 at a certain timing (a touch due to the presence of foreign matter), the time elapsed since the touch was detected does not reach the time T1 in the stationary determination in step S120 immediately after step S120, a determination result of nonstationary is given (steps S1203 to S1205 in FIG. 4). Through a repetition of the erroneous touch detection determining process, however, the elapsed time since the first detection (i.e., elapsed time in which determination of "Yes" continues in both step S1201 and step S1202) reaches the time T1 in some steps S120, and a determination result of stationary is given (steps S1203 to S1204 in FIG. 4).

Description will now return to FIG. 2. In step S140, the touch determination unit 33 determines, as an invalid touch, a touch point determined to be stationary for the time T1 or longer in step S120, and sets an invalid touch flag in step S150.

Next, in step S160, the touch determination unit 33 calculates the area of a touch point for each touch detected by the touch detection process. In step S160, the area of each touch is calculated for touches detected by the touch detection process except for a touch determined as an invalid touch in step S140.

In step S170, the touch determination unit 33 determines whether or not the area of each touch calculated in step S160 is greater than or equal to a predetermined threshold TH3 of the touch area. The threshold TH3 corresponds to the third predetermined threshold of a touch area. If the touch points whose areas were calculated in step S160 include at least one touch point having an area greater than or equal to the threshold TH3 ("Yes" in step S170), the process proceeds to step S180. On the other hand, if the touch points whose areas were calculated in step S160 include no touch point having an area greater than or equal to the threshold TH3 ("No" in step S170), the process skips steps S180 and S190.

The threshold TH3 is, for example, 20 square centimeters expected as the maximum area of a touch point by a finger. However, if an operation with a touch pen without a finger is assumed, the threshold TH3 may be smaller than that in the case of a finger, such as one square centimeter, for example. As compared to the area generally occupied by a finger or the like that is moved by a user for an operation of the touch panel 20, a touch point having an obviously larger area is highly likely to be foreign matter such as a paper sheet left on the display section 21. Thus, a touch point whose area is the threshold TH3 or more can be regarded as corresponding to an invalid touch. In step S180, the touch determination unit 33 determines, as an invalid touch, a touch point whose area was determined to be the threshold TH3 or more in step S170, and the touch determination unit 33 sets an invalid touch flag in step S190. If an invalid touch flag has been already set in a stage previous to step S190, an invalid touch flag does not need to be additionally set in step S190.

A touch that is not an invalid touch corresponds to a valid touch. Thus, in each of the process of steps S120 to S150 (first determination process) and the process of steps S160 to S190 (second determination process), it is determined whether a touch detected by the touch detection process is a valid touch or an invalid touch. Foreign matter on the display section 21 is basically stationary. Thus, the foreign matter on the display section 21 is determined to be an invalid touch in the first determination process in most cases.

However, it is possible that foreign matter on the display section 21 greatly moves and is not stationary under the influence of vibrations caused by wind or the like. As described above, a user's hand unconsciously placed on the display section 21 (user's hand opposite to a hand actively moved for an operation) should be regarded as foreign matter. In view of this, in this embodiment, the first determination process of determining a touch that is stationary for a certain period or longer as an invalid touch and the second determination process of determining a touch whose area is larger than a threshold as an invalid touch are performed to, thereby, determine various types of foreign matter on the display section 21 from as invalid touches with high accuracy.

In the erroneous touch detection determining process, the process proceeds to processes after step S200 (FIG. 3) through the first determination process and the second determination process. An aspect in which the process proceeds to processes after step S200 through one of the first determination process and the second determination process is also included in the range of disclosure of the embodiment.

In step S200, the touch determination unit 33 determines whether an invalid touch flag is set or not. If an invalid touch flag is set ("Yes" in step S200), the process proceeds to step S210, whereas if an invalid touch flag is not set ("No" in step S200), the process proceeds to step S240.

In step S240, the instruction acceptance unit 34 accepts an instruction based on a valid touch, and performs a predetermined process in accordance with the instruction. For example, if the valid touch indicates an input of a character or a figure, an input of the indicated character or figure is accepted. If the valid touch instructs switching of a display content on the display section 21, for example, the display control unit 35 is notified of this instruction, and is caused to perform switching of the display content, for example, in accordance with the instruction. If the process proceeds from step S200 directly to step S240, all the touches detected by the touch detection process are valid touches, and instructions based on such valid touches are accepted.

On the other hand, in step S210, the touch determination unit 33 branches the process based on whether a valid touch is included in touches detected by the touch detection process or not. If a valid touch is included in the touches detected by the touch detection process ("Yes" in step S210), the process proceeds to step S220, whereas if all the touches detected by the touch detection process are invalid touches ("No" in step S210), the process proceeds to step S250.

In step S250, the control section 30 branches the process based on whether setting of always issuing warning about an invalid touch without fail is made or not. In this embodiment, through an input to the touch panel 20 or other unillustrated input units, a user can arbitrarily select and set, to the touch panel device 10 (control section 30) beforehand, a first warning mode in which a warning about an invalid touch is issued in every case where an invalid touch is included or a second warning mode in which a warning about an invalid touch is issued in a case where predetermined conditions are established although an invalid touch is included. The second warning mode is a mode in which a warning about an invalid touch is issued only in a situation where the position of a valid touch cannot be accurately determined because of the influence of an invalid touch (see FIG. 5). A specific example of a warning about an invalid touch will be described in detail with reference to FIGS. 5, 6A, and 6B. It is assumed that initial setting of a warning mode in a case where the first warning mode or the second warning mode is not set beforehand to the control section 30 is, for example, the second warning mode.

If the setting of a warning mode about an invalid touch is the first warning mode ("Yes" in step S250), the control section 30 proceeds to step S260, a warning about an invalid touch is issued, and then the flowchart of the erroneous touch detection determining process (FIGS. 2 and 3) is finished. On the other hand, if the setting of a warning mode is the second warning mode ("No" in step S250), in a situation where no valid touches are present, it is unnecessary to issue a warning about an invalid touch, and thus, the flowchart of the erroneous touch detection determining process is finished without any process (FIGS. 2 and 3).

In step S220, the control section 30 determines whether the position of a valid touch among touches detected by the touch detection process can be accurately obtained or not. In a situation where the position of a valid touch is accurately obtained ("Yes" in step S220), the process proceeds to step S230. On the other hand, in a situation where the position of the valid touch cannot be accurately obtained because of the influence of an invalid touch ("No" in step S220), the process proceeds to step S260, a warning about an invalid touch is issued, and then the flowchart of the erroneous touch detection determining process (FIGS. 2 and 3) is finished.

In step S230, the control section 30 performs determination in a manner similar to that in step S250, and if the setting of the warning mode is the first warning mode ("Yes" in step S230), the process proceeds to step S260, and the control section 30 issues a warning about an invalid touch and then finishes the flowchart of the erroneous touch detection determining process (FIGS. 2 and 3). On the other hand, if the setting of the warning mode is the second warning mode ("No" in step S230), this case is a situation where the position of a valid touch can be accurately obtained, and thus, the process proceeds to step S240, and the instruction acceptance unit 34 accepts an instruction based on a valid touch and performs a predetermined process in accordance with this instruction. In performing step S240 through steps S200 and S210, the control section 30 ignores an invalid touch included in simultaneous touches on a plurality of points on the display section 21, and accepts an instruction based on a valid touch included in the simultaneous touches.

Figure 5:
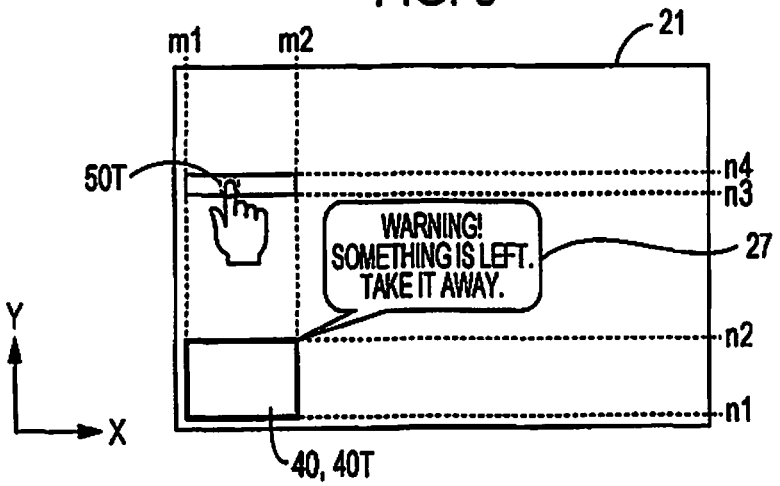
FIG. 5 is an illustration of a situation where a valid touch position cannot be accurately determined and an example of a warning.

FIG. 5 illustrates a situation where the position of a valid touch cannot be accurately obtained because of the influence of an invalid touch and an example of a warning about the invalid touch. In FIG. 5, it is assumed that a rectangular paper sheet (e.g., business card) 40 is placed as an example of foreign matter near a lower left corner on the display section 21. The touch detection unit 32 detects a touch for the paper sheet 40. Specifically, as illustrated in FIG. 5, a rectangular region on the display section 21 specified as a range of X=m1 to m2 and Y=n1 to n2 on coordinates is detected as a touch point (touch 401) corresponding to the paper sheet 40 by the touch detection unit 32.

In addition, as exemplified by FIG. 5, it is assumed that a touch point (touch 50T) contacted by a user's finger on an arbitrary position on the display section 21 is detected by the touch detection unit 32 in association with the finger. In the erroneous touch detection determining process described above, the touch 40T corresponding to the paper sheet 40 is determined as an invalid touch by the first determination process or the second determination process. On the other hand, the touch 50T by the user's finger moves slightly or the touch area thereof varies, that is, the touch 50T is not stationary, and is not determined as an invalid touch by any of the first determination process and the second determination process (i.e., is determined as a valid touch). An actual area of the touch 50T is not ascertained as described later, but unless the area is determined to be obviously the threshold TH3 or more, the touch 50T is not determined as an invalid touch.

In the example of FIG. 5, the X coordinate of the touch 50T is included in the range of the X coordinate of the touch 40T (i.e., X=m1 to m2). Although the touch 50T corresponding to the user's finger is originally in a shape based on a fingertip (see a circle indicated by a broken line in FIG. 5), it is difficult for the touch detection unit 32 to specify the X coordinate of the touch 50T in the range of X=m1 to m2 in a situation where the touch 40T is detected. In view of this, as illustrated in FIG. 5, the touch detection unit 32 detects, as a touch 50T, a rectangular region on the display section 21 as a range of coordinates in which X=m1 to m2 and Y=n3 to n4. In this manner, a valid touch whose X coordinate or Y coordinate overlaps the range of an X coordinate or a Y coordinate of an invalid touch thus cannot be specified, which corresponds to a "valid touch whose position cannot be accurately specified because of the influence of an invalid touch."

In step S220 described above (see FIG. 3), the control section 30 determines, for each valid touch, whether the range of the X coordinate or the Y coordinate of the valid touch matches a range of the X coordinate or the Y coordinate of any invalid touch. If there is a valid touch whose range of the X coordinate or the Y coordinate matches the range of the X coordinate or the Y coordinate of any invalid touch, it can be determined that the position of the effective touch cannot be accurately determined because of the influence of an invalid touch in the current situation ("No" in step S220).

FIG. 5 illustrates an example of a warning message 27. Specifically, if the process proceeds from step S220 to step S260, the display control unit 35 causes the display section 21 to display such a warning message 27 so that a warning about an invalid touch is issued. A user visually recognizes the warning message 27 to notify foreign matter (paper sheet 40) on the display section 21 and can remove the foreign matter from the display section 21. As shown in FIG. 5, the warning message 27 is displayed at a position on the display section 21 that does not overlap any of the detected touches (touches 40T and 50T) (the same holds for FIGS. 6A and 6B). That is, the display control unit 35 causes a warning about a touch determined as an invalid touch to be displayed at a position on the display section 21 where no touched are detected. In this manner, the warning message 27 can be easily visually recognized by a user.

Figure 6A:
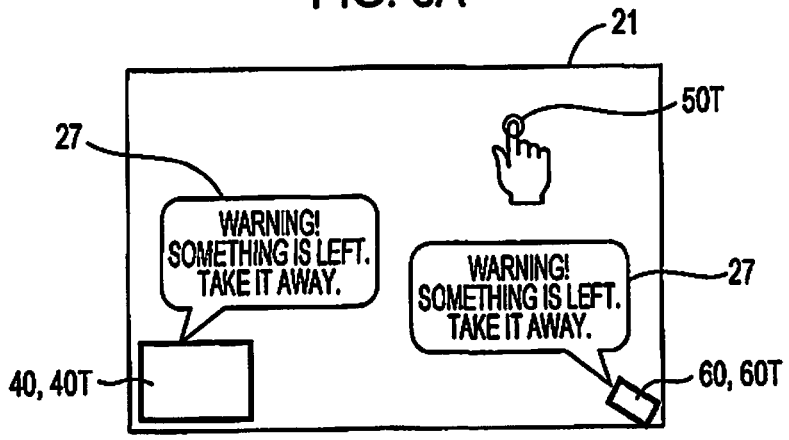
FIG. 6A illustrates an example of a warning.

FIG. 6A illustrates another example of a warning about an invalid touch different from the example illustrated in FIG. 5. In a manner similar to FIG. 5, in FIG. 6A, a rectangular paper sheet (e.g., business card) 40 is placed as an example of foreign matter near a lower left corner on the display section 21. A stationery (e.g., eraser) 60 is placed as an example of foreign matter near a lower right corner on the display section 21. The touch detection unit 32 detects one touch point (touch 40T) in association with the paper sheet 40, and another touch point (touch 60T) in association with the stationery 60. In FIG. 6A, a touch by a user's finger on an arbitrary position on the display section 21 causes one touch point (touch 50T) corresponding to the finger to be detected by the touch detection unit 32. In the touch 50T illustrated in FIG. 6A, each of the X coordinate and the Y coordinate does not overlap any of invalid touches (touches 40T and 60T) corresponding to foreign matter, and thus, the touch 50T corresponds to a valid touch point whose position can be accurately obtained.

Thus, if the process proceeds from step S230 (see FIG. 3) to step S260, the display control unit 35 causes the display section 21 to display the warning message 27 as illustrated in FIG. 6A. As illustrated in FIG. 6A, if there are a plurality of invalid touches, the display control unit 35 may cause the display section 21 to display a plurality of warning messages 27 in association with individual invalid touches (touches 40T and 60T). In addition, the display control unit 35 may cause the warning message 27 of each invalid touch to include a message suggesting the position of the invalid touch on the display section 21. The position (X and Y coordinates) of each touch is specified by the touch detection unit 32 (although this specification might be inaccurate). Thus, based on the position (X and Y coordinates) of an invalid touch specified by the touch detection unit 32, the display control unit 35 may cause the display section 21 to display a warning message such as "Warning! Something is left on the lower left on the screen. Remove it." The display control unit 35 does not need to use only characters displayed on the display section 21 and only needs to employ a warning message 27 designed to suggest the position of foreign matter as a result.

Figure 6B:
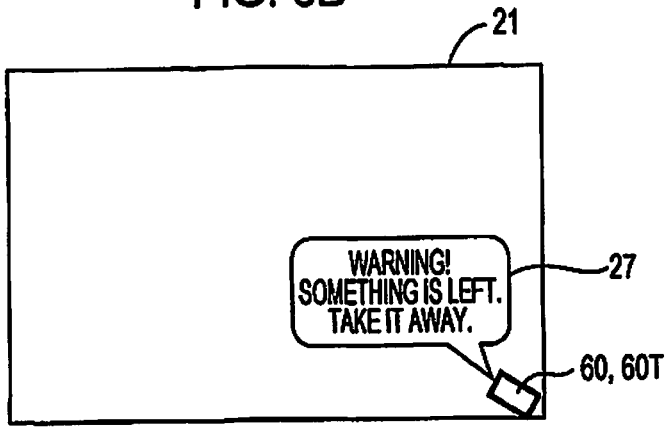
FIG. 6B illustrates an example of a warning.

FIG. 6B illustrates another example of a warning about an invalid touch different from those illustrated in FIGS. 5 and 6A.

In a manner similar to FIG. 6A, in FIG. 6B, a stationery (e.g., eraser) 60 is placed as an example of foreign matter near a lower right corner on the display section 21. In other words, FIG. 6B illustrates a situation after a user has removed part of the foreign matter (paper sheet 40) in the situation illustrated in FIG. 6A. In the erroneous touch detection determining process (see FIGS. 2 and 3) that is performed again after the removal of the paper sheet 40 from the display section 21, the touch detection unit 32 detects one touch point (touch 60T) in association with the stationery 60. The touch 60T is an invalid touch, and in the example illustrated in FIG. 6B, no valid touches are present. Thus, if the process proceeds from step S210 (FIG. 3) to step S260 through step S250, the display control unit 35 causes the display section 21 to display a warning message 27 associated with the touch 60T as illustrated in FIG. 6B. As shown in FIGS. 6A and 6B, once the foreign matter has been removed from the display section 21, the warning message 27 displayed in association with the removed foreign matter is erased from the display section 21.

As described above, the display control unit 35 displays a warning (warning message 27) about an invalid touch at a position on the display section 21 where no touches are detected in step S260. In this case, the display control unit 35 may further display a warning message 27 at a position except a position below a valid touch (e.g., touch 50T) on the display section 21.

In most cases, the position below the valid touch on the display section 21 is a position that is readily hidden by a user's arm when seen by the user. For this reason, the warning message 27 is displayed at a position except a position below the valid touch on the display section 21, thereby enhancing visual recognizability of a user to the warning message 27.

As exemplified by FIGS. 5, 6A, and 6B, the warning message 27 is ideally displayed at a position on the display section 21 where no touches are detected. With some areas, numbers, and positional relationships among detected touches, all the warning message 27 are not always displayed at positions on the display section 21 where no touches are detected. Even in such cases, the display control unit 35 gives higher priority to prevention of overlapping in display of the warning message 27 with a position of an invalid touch than to prevention of overlapping in display of the warning message 27 with the position of a valid touch on the display section 21. Then, the display control unit 35 determines the display position of the warning message 27, and causes the display section 21 to display the warning message 27. This is because when the warning message 27 is displayed at a position of an invalid touch, that is, a position where foreign matter is placed, the warning message 27 is hidden by the foreign matter and cannot be visually recognized by a user.

In addition, in displaying a warning (warning message 27) about an invalid touch in step S260, the control section 30 may also output a beep sound from an unillustrated loudspeaker or vibrate an unillustrated vibrator to alert a user. Only in a case where the warning message 27 has to overlap the position of a part of touches as described above, the control section 30 may especially alert a user by additionally using the beep sound and/or the vibration.

Figure 7:
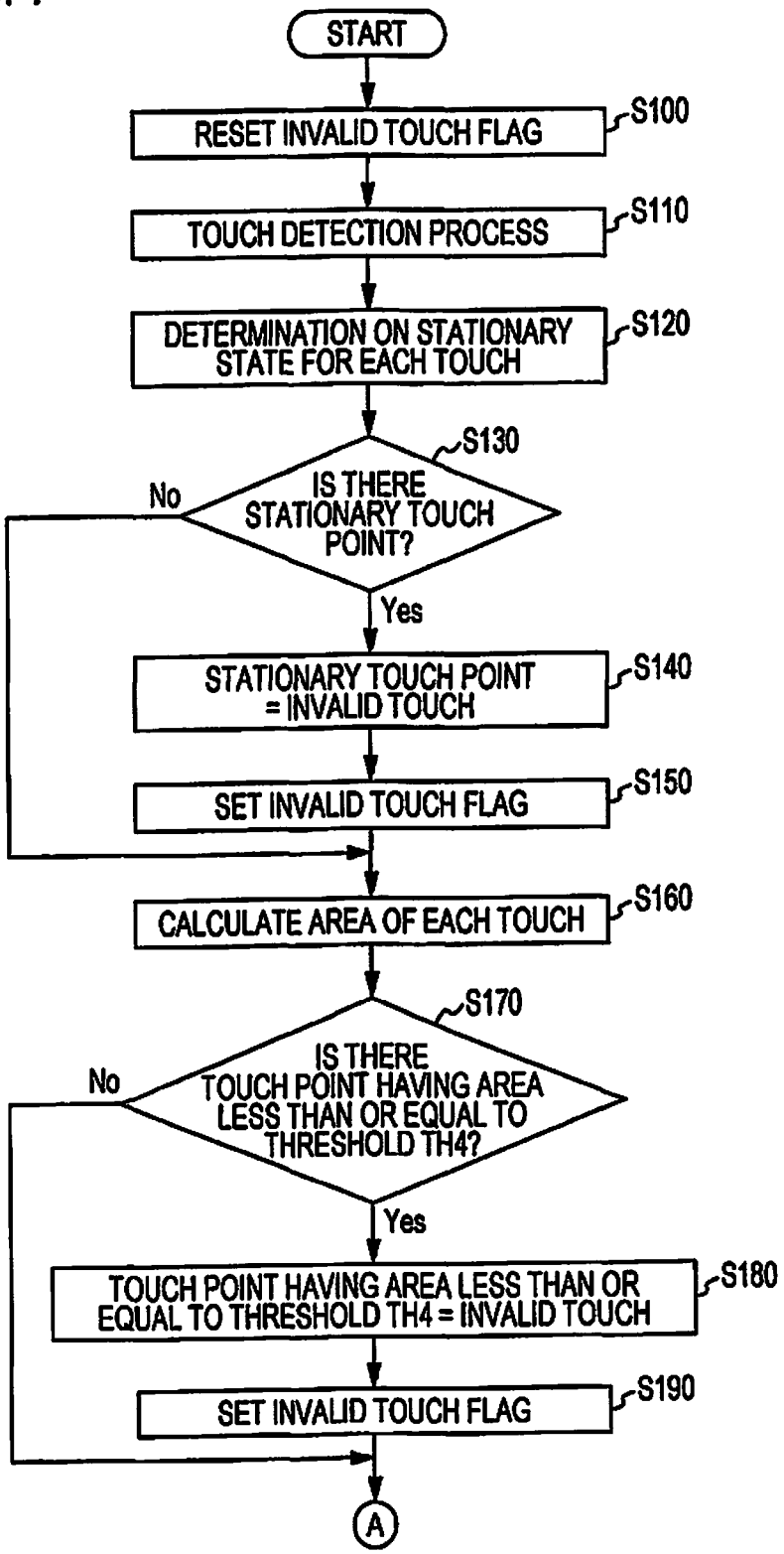
FIG. 7 is a flowchart depicting a variation of the flowchart of FIG. 2.

FIG. 7 depicts a variation of a part of the erroneous touch detection determining process depicted by FIG. 2. The processes in steps S170 and 180 in FIG. 7 are different from those in FIG. 2. In step S170 of this variation, the touch determination unit 33 determines whether the area of each touch calculated in step S160 is less than or equal to a predetermined threshold TH4 of the touch area. The threshold TH4 corresponds to a predetermined fourth threshold of the area of a touch, and is smaller than the threshold TH3. If the touch points whose areas were calculated in step S160 include at least one touch point having an area less than or equal to the threshold TH4 ("Yes" in step S170), the process proceeds to step S180. On the other hand, if the touch points whose areas were calculated in step S160 include no touch point having an area less than or equal to the threshold TH4 ("No" in step S170), the process skips steps S180 and S190.

As compared to the area generally occupied by a finger or the like that is moved by a user for an operation of the touch panel 20, a touch point having an obviously small area is highly likely to be foreign matter such as waste exemplified by dust or dirt on the display section 21. Thus, a touch point whose area is the threshold TH4 or less can be regarded as corresponding to an invalid touch. In step S180, the touch determination unit 33 determines, as an invalid touch, a touch point whose area was determined to be the threshold TH4 or less in step S170, and the touch determination unit 33 sets an invalid touch flag in step S190. In this variation, the first determination process of determining a touch that is stationary for a certain period or longer as an invalid touch and the second determination process of determining a touch whose area is less than or equal to a threshold as an invalid touch are performed to, thereby, determine various types of foreign matter on the display section 21 from an invalid touch with high accuracy.

As another variation, in step S170, for each touch point whose area was calculated in step S160, the touch determination unit 33 may determine whether the area of the touch point corresponds to an area greater than or equal to the threshold TH3 or the area less than or equal to the threshold TH4. In this case, if the touch points whose areas were calculated in step S160 include at least one touch point having an area greater than or equal to the threshold TH3 or less than or equal to the threshold TH4 ("Yes" in step S170), the process proceeds to step S180.

On the other hand, if the touch points whose areas were calculated in step S160 include no touch point having an area greater than or equal to the threshold TH3 or less than or equal to the threshold TH4 ("No" in step S170), the process skips steps S180 and S190. Then, in step S180, the touch determination unit 33 determines, as an invalid touch, a touch point whose area was determined to be greater than or equal to the threshold TH3 or less than or equal to the threshold TH4 in step S170, and the touch determination unit 33 sets an invalid touch flag in step S190. That is, in the second determination process, the predetermined two thresholds TH3 and TH4 for the area of a touch may be used to determine, as an invalid touch, a touch point having an area obviously larger or smaller than an area generally occupied by a touch point by a finger or the like.

3. Second Embodiment

A second embodiment will now be described.

Figure 8:
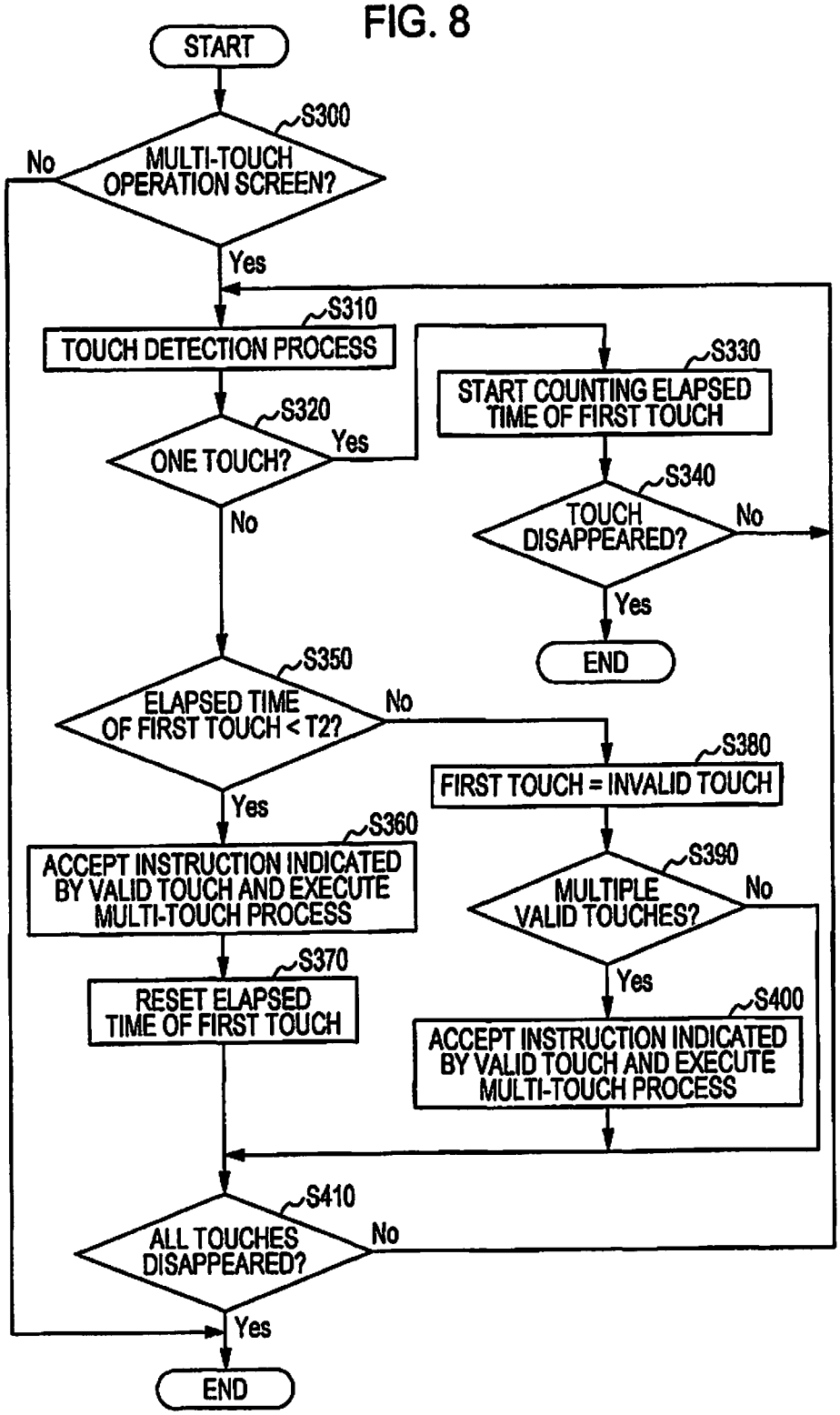
FIG. 8 is a flowchart depicting an erroneous touch detection determining process for a multi-touch operation screen according to a second embodiment.

FIG. 8 depicts a flowchart of an erroneous touch detection determining process for a multi-touch operation screen. This flowchart is also performed by the control section 30 in accordance with the program 31. The multi-touch operation screen refers to an operation screen displayed on the display section 21 and operable with a multi-touch by a user. Examples of the multi-touch include a gesture in which two fingers are moved to approach each other on the display section 21 (pinch-in), a gesture in which two fingers are moved to be apart from each other (pinch-out), a gesture of tapping with two fingers, a gesture of scrolling with two fingers, a gesture of rotating one finger about the other finger, and a gesture with three or more fingers.

The control section 30 determines whether an operation screen currently displayed on the display section 21 is a multi-touch operation screen or not (step S300). If the multi-touch operation screen is not displayed ("No" in step S300), the flowchart (see FIG. 8) is finished, whereas if the multi-touch operation screen is displayed ("Yes" in step S300), the process proceeds to step S310 and subsequent steps. In step S310, the touch detection unit 32 performs a touch detection process. In the touch detection process, the touch detection unit 32 detects whether a touch is made on the display section 21 or not as described above, and if one or more touches on one or more points on the display section 21 are successfully detected, the process proceeds to step S320.

In step S320, the touch determination unit 33 branches the process based on whether the number of touches detected by the touch detection process in step S310 is one or not. If one touch is detected ("Yes" in step S320), the process proceeds to step S330, whereas if a plurality of touches are detected ("No" in step S320), the process proceeds to step S350.

In the description concerning FIG. 8, it is assumed that a plurality of touches on the display section 21 are made with time intervals. Specifically, assumed situations include a situation in which if foreign matter is present on the display section 21, a user touches an arbitrary position on the display section 21 with a finger or the like and a situation in which a user touches an arbitrary position on the display section 21 with one finger and, at the same time, touches another position on the display section 21 with another finger. A situation where a user touches the display section 21 with a plurality of fingers completely at the same time (i.e., without time intervals described above) is also conceivable. However, such completely simultaneous touches are reasonable touches on the multi-touch operation screen and can be negligible here.

In step S330, the touch determination unit 33 starts counting a time in which a touch continues (elapsed time) on a touch detected by the touch detection process in step S310 (a solely detected touch, i.e., a first touch). After the start of counting such an elapsed time, the touch determination unit 33 determines whether the first touch has disappeared or not (step S340). The term "a touch has disappeared" refers to a state in which a touch whose presence has been detected by the touch detection unit 32 cannot be detected any more. In the case where the first touch disappears ("Yes" in step S340), the touch determination unit 33 finishes the flowchart (see FIG. 8), whereas if the first touch does not disappear ("No" in step S340), the process returns to step S310.

That is, while one touch is made on the display section 21 and continues, steps S310 to S340 are repeated. In the case of repeating steps S310 to S340, however, since counting of the elapsed time of the first touch is started in step S330 in a first cycle, step S330 is unnecessary in the second cycle and later and is skipped. Through repetition of steps S310 to S340, another touch occurs on the display section 21. If this touch is detected by the touch detection unit 32, determination of "No" is made in step S320, and the process proceeds to step S350.

In step S350, the touch determination unit 33 determines whether the elapsed time of the first touch is less than a predetermined time T2 (second time) or not. This is equivalent to determination on whether a time from detection of the first touch until a next touch is detected. If the elapsed time of the first touch is less than the time T2 ("Yes" in step S350), the touch determination unit 33 proceeds to step S360, whereas if the elapsed time of the first touch is the time T2 or longer ("No" in step S350), the process proceeds to step S380. If the elapsed time of the first touch is less than the time T2, the touch determination unit 33 does not determine the first touch as an invalid touch.

In step S360, the instruction acceptance unit 34 accepts an instruction based on a valid touch and performs a predetermined multi-touch process in accordance with the instruction. That is, in accordance with an instruction based on currently detected touches (touches including the first touch), such as an instruction based on pinch-in, scale-down or other operation of display on the display section 21 is performed by the display section 21 through the display control unit 35. After step S360 has been finished, in step S370, the touch determination unit 33 resets an elapsed time of the first touch (returns the elapsed time to zero).

On the other hand, in step S380, the touch determination unit 33 determines, as an invalid touch, the first touch for which the elapsed time is greater than or equal to the time T2, and the process proceeds to step S390. That is, the touch determination unit 33 determines, as invalid touch, a touch that is first detected in two touches detected with an interval of the time T2 or longer. As in the case where a user touches an arbitrary point on the display section 21 with a finger or the like at a timing with foreign matter being present on the display section 21, there is seldom a correlation between two touches detected with a long time interval. Thus, by determining as an invalid touch, a touch first detected in two touches detected with an interval of the time T2 or longer, it is possible to avoid erroneous recognition that a touch by foreign matter is a part of a multi-touch.

In step S390, the touch determination unit 33 determines whether currently detected touches include a plurality of valid touches or not. If the currently detected touches include a plurality of valid touches ("Yes" in step S390), the process proceeds to step S400, whereas if the currently detected touches do not include a plurality of valid touches ("No" in step S390), the process skips step S400. If the number of currently detected touches is two including the first touch determined as an invalid touch in step S380, "No" is selected in step S390. In step S400, in a manner similar to step S360, the instruction acceptance unit 34 accepts an instruction based on a valid touch and performs a predetermined multi-touch process in accordance with the instruction.

After each of step S370, step S400, and the selection of "No" in step S390, the control section 30 determines whether all the touches on the display section 21 have disappeared or not (step S410), and if all the touches have disappeared ("Yes" in step S410), this flowchart (FIG. 8) is finished. On the other hand, one or more touches have not disappeared and remain ("No" in step S410), the process returns to step S310.

In step S310 after step S410, a touch point determined to remain at the time of step S410 is at least detected without change. In the course of the process until step S310, a larger number of touches can be additionally made on the display section 21. The presence of a touch point determined as an invalid touch in step S380 is ignored by the instruction acceptance unit 34, but can be detected later by the touch detection unit 32. For example, even in a case where a touch by foreign matter on the display section 21 (the first touch) is determined as an invalid touch in step S380, as long as the foreign matter remains on the display section 21, "No" is selected in step S410 and the touch by the foreign matter continues to be detected in step S310.

In step S320 after steps S410 and S310, if the number of touches is determined to be one ("Yes" in step S320), the process proceeds to step S330. In this case, if reset of the elapsed time (step S370) is not performed immediately before step S410, the elapsed time of the first touch continues to be counted, whereas if reset of the elapsed time (step S370) is performed immediately before step S410, an elapsed time of the currently detected touch (the first touch) starts to be counted again.

On the other hand, in step S320 after steps S410 and S310, suppose the number of touches is determined to be two or more ("No" in step S320). In this case, if reset of the elapsed time (step S370) is not performed immediately before step S410, a result of counting of the elapsed time of the first touch that continues at this time is used for determination in step S350. On the other hand, if reset of the elapsed time (step S370) is performed immediately before step S410, the touch determination unit 33 may regard, as a first touch, a touch actually detected at an earliest timing by the touch detection unit 32 among currently detected touches, for example, to start counting an elapsed time again at a timing at which "No" is selected in step S320.

The process of flowchart illustrated in FIG. 8 as described above will be described in consideration of a typical operation example of a multi-touch operation screen by a user. For example, suppose foreign matter is present on the display section 21 and the touch detection unit 32 detects a touch ("first touch") in association with the foreign matter. In this case, steps S310 to S340 are repeated. In this situation, suppose a user touches the display section 21 with one of two fingers first in order to operate the multi-touch operation screen. As a result, the touch detection unit 32 detects a "second touch" and determination in step S350 is performed through the determination of "No" in step S320. In step S350, it is determined that an elapsed time after detection of the first touch corresponding to the foreign matter exceeds the time T2, and in step S380, the first touch corresponding to the foreign matter is determined as an invalid touch.

In subsequent step S390, a valid touch is only the second touch associated with the first finger of the user (i.e., the number of valid touches is one), and thus, "No" is selected. However, the user brings the second finger into contact with the display section 21 shortly after the first finger touches the display section 21. In this manner, the touch detection unit 32 detects a "third touch." Thus, even in a case where "No" is once selected in step S390, if determination in step S390 is performed again after steps S410, S310, S320, S350, and S380, valid touches are the second touch corresponding to the first finger of the user and the third touch corresponding to the second finger of the user. As a result, in step S390 performed again, a plurality of valid touches are present, and thus, "Yes" is selected. Subsequently, in step S400, a multi-touch process in accordance with the valid touches (second touch and third touch) is performed. That is, even when the control section 30 detects a touch by foreign matter (first touch), the control section 30 can accept a multi-touch (second and third touches) by a user while ignoring the touch by the foreign matter.

4. Summary

In the foregoing manner, in these embodiments, the touch panel device 10 can detect simultaneous touches on a plurality of points on the display section 21. Also the touch panel device determines whether the simultaneous touches that have been detected include a valid touch or an invalid touch. For example, the touch panel device 10 determines whether each of the detected touches is a valid touch or an invalid touch. An invalid touch included in the simultaneous touches is ignored, and an instruction based on a valid touch included in the simultaneous touches is accepted. For example, among the detected touches, a touch that is stationary for the time T1 or longer, a touch having an area greater than or equal to the threshold (TH3), a touch having an area less than or equal to the threshold (TH4, where TH4<TH3), and a touch detected first in two touches detected with a time interval of the time T2 or longer, are determined as invalid touches. Thus, even if foreign matter is present on the display section 21, a touch corresponding to the foreign matter is ignored as an invalid touch, and an instruction based on a valid touch, that is, an instruction in accordance with an operation by a user, is accepted. In this manner, a failure in performing an operation intended by a user because of the influence of the foreign matter can be avoided, and thus, the user can operate the touch panel device 10 with comfort.

A relationship between the first embodiment and the second embodiment will be described. Each of the first embodiment and the second embodiment is an embodiment disclosed by the invention, and an aspect as a combination of these embodiments is also within the range of disclosure of the invention. For example, in the second embodiment (FIG. 8), the control section 30 determines, as an invalid touch, even the first touch that cannot be determined as an invalid touch in the determination in step S350 if this first touch can be determined as an invalid touch by the first determination process or the second determination process in the first embodiment (FIGS. 2, 3, 4, and 7) (step S380). This further ensures that a touch associated with foreign matter can be ignored. In the second embodiment, the display control unit 35 can cause the display section 21 to display a warning (warning message 27) as described above about a touch determined as invalid. For example, at a timing after step S380 in which the first touch is determined as an invalid touch, a warning message 27 about the invalid touch may be displayed by the display section 21.

The idea of determining, as an invalid touch, a touch detected first in two touches detected with an interval of the time T2 or longer is also applicable to situations as well as the situation in which the multi-touch operation screen is operated.

For example, suppose in a situation where a single-touch operation screen to be operated by a single-touch is displayed on the display section 21, foreign matter is present on the display section 21 and the touch detection unit 32 detects a touch (first touch) associated with the foreign matter. In a case where this situation continues for the time T2 or longer and a user touches an arbitrary point on the display section 21, the touch detection unit 32 additionally detects a touch (second touch) associated with the user's touch. In this case, the touch determination unit 33 determines, as an invalid touch, the first touch that has been determined as a valid touch until this point of time, and determines the second touch as a valid touch. Then, the instruction acceptance unit 34 accepts an instruction based on the second touch determined as the valid touch.

Suppose while a user touches an arbitrary point on the display section 21, the user touches another point, and immediately afterward, the subsequent touch is detached from the display section 21. In such a case, in consideration of a user's mind, it is appropriate to regard the prior touch (first touch) as a valid touch. In view of this, in a case where the touch subsequently detected in touches detected with a time interval of the time T2 (second touch) continues for a third time (time T3) or longer, the touch determination unit 33 may determine the touch first detected (first touch) as an invalid touch. In other words, in a case where the touch subsequently detected in two touches detected with a time interval of the time T2 or longer (second touch) disappears without continuing for the time T3 or longer, the first detected touch (first touch) continues to be determined as a valid touch. With this configuration, in a case where the second touch detected by the touch detection unit 32 after the first touch immediately disappears, the first touch is not determined as an invalid touch, which is suitable for an intention of a user.

In the foregoing description, the touch panel 20 is an optical touch panel, but is not limited to the optical touch panel. A technique employed by the touch panel 20 may be other techniques including a resistive film technique, a capacitance technique, and an ultrasonic surface acoustic wave technique.

A processor or the like for performing the processes described above and a touch panel do not need to be provided on the same device, and may be provided in different devices.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A touch panel device comprising:

a processor configured to detect simultaneous touches on a plurality of points on a display;

determine whether the simultaneous touches that have been detected include a valid touch or an invalid touch; and ignore the invalid touch and accept an instruction based on the valid touch, when the processor detects two touches detected with a first interval of a predetermined time or longer, and the two touches detected with the first interval are a first touch detected first and a second touch detected second and later than the first touch, the processor being configured to determine whether or not the second touch of the two touches with the first interval continues for a time equal to or more than a threshold time, the processor being configured to determine, as the valid touch, the first touch of the two touches with the first interval, in response to determining that the second touch of the two touches with the first interval does not continue for the time, and the processor being configured to determine, as the invalid touch, the first touch of the two touches with the first interval, in response to determining that the second touch of the two touches with the first interval continues for the time.

2. The touch panel device according to claim 1, wherein the processor is configured to determine, as the invalid touch, the first touch that is stationary for a first time or longer.

3. The touch panel device according to claim 1, wherein the processor is configured to determine, as the invalid touch, the first touch for which an amount of change of touch center coordinates is less than a first predetermined threshold for a first time or longer and for which an amount of change of a touch area is less than a second predetermined threshold for the first time or longer.

4. The touch panel device according to claim 1, wherein the processor is configured to determine, as the invalid touch, the first touch having an area greater than or equal to a [third] *first* predetermined *area* threshold.

5. The touch panel device according to claim 4, wherein the processor is configured to further determine, as the invalid touch, the first touch having an area less than or equal to a [fourth] *second* predetermined *area* threshold smaller than the [third] *first* predetermined *area* threshold.

6. The touch panel device according to claim 1, wherein the processor is further configured to cause a warning about a touch determined as the invalid touch at a position on the display, the position being a position where no touch is detected.

7. A non-transitory nonvolatile storage medium storing a touch panel control program that causes a computer to execute:

detecting simultaneous touches on a plurality of points on a display;

determining whether the simultaneous touches that have been detected include a valid touch or an invalid touch; and accepting an instruction based on the valid touch while ignoring the invalid touch, when two touches detected with a first interval of a predetermined time or longer are detected, and the two touches detected with the first interval are a first touch detected first and a second touch detected second and later than the first touch, whether or not the second touch of the two touches with the first interval continues for a time equal to or more than a threshold time being determined, the first touch of the two touches with the first interval being determined as the valid touch, in response to determining that the second touch of the two touches with the first interval does not continue for the time, and the first touch of the two touches with the first interval being determined as the invalid touch in response to determining that the second touch of the two touches with the first interval continues for the time.

8. The touch panel device according to claim 1, wherein when the processor detects two touches detected with a second interval less than the predetermined time, after a predetermined multi-touch process has been performed based on a first touch detected first and a second touch detected second in the two touches with the second interval, when the processor determines that the first touch of the two touches with the second interval does not disappear and remains, when the processor determines a count number of detected touches is more than one by detecting the first touch that remains and a third touch that is detected after detecting the two touches with the second interval, and when a time which is restarted from when the processor determines the count number is more than one is less than the predetermined time, the processor is configured to determine the first touch of the two touches with the second interval as the valid touch.

9. The touch panel device according to claim 1, wherein the processor is configured to determine the first touch as the invalid touch further when the first touch is stationary for a first time or longer, or when *the* first touch is not stationary for the first time or longer and an area of the first touch, which the processor calculates, is greater than or equal to a [third] *first* predetermined *area* threshold.

*10. The touch panel device according to claim 1, wherein the processor is further configured to determine, as the invalid touch, the second touch of the two touches, in response to determining that the second touch of the two touches does not continue for the time, and*

*the processor is further configured to determine, as the valid touch, the second touch of the two touches, in response to determining that the second touch of the two touches continues for the time.*

*11. The non-transitory nonvolatile storage medium according to claim 7, wherein*

*the second touch of the two touches is determined as the invalid touch, in response to determining that the second touch of the two touches does not continue for the time, and*

*the second touch of the two touches is determined as the valid touch in response to determining that the second touch of the two touches continues for the time.*

* * * * *